United States Patent [19]

Van Der Meulen et al.

[11] 3,847,594

[45] Nov. 12, 1974

[54] DISINTEGRATION OF SCRAP ALLOYS TO FACILITATE RECOVERY OF NICKEL, COBALT AND COPPER VALUES

[75] Inventors: Sjaak Johan Van Der Meulen; Bauke Weizenbach; Allan Henry Lee, all of Fort Saskatchewan, Alberta; Theodore Andrew Kinjerski, Bon Acord, Alberta, all of Canada

[73] Assignee: Sherritt Gordon Mines Limited, Toronto, Ontario, Canada

[22] Filed: Nov. 27, 1973

[21] Appl. No.: 419,328

Related U.S. Application Data

[63] Continuation-in-part of Ser. No. 203,834, Dec. 1, 1971, abandoned.

[52] U.S. Cl............... 75/63, 75/101 R, 423/53, 423/138, 423/566, 423/632
[51] Int. Cl............................................. C22b 7/00
[58] Field of Search............... 75/63, 72, 82, 101 R; 423/138, 561, 566, 592, 606, 632, 604, 48

[56] References Cited
UNITED STATES PATENTS 3,082,068   3/1963   Schlecht et al. ............... 423/48
3,424,574   1/1969   Irani ............................... 75/53
3,577,231   5/1971   Pesses ........................... 75/63 X Primary Examiner—L. Dewayne Rutledge
Assistant Examiner—M. J. Andrews
Attorney, Agent, or Firm—Frank I. Piper; Arne I. Fors; James T. Wilbur

[57] ABSTRACT

Iron-chromium scrap alloy in the form of machine turnings, chips and the like is treated to cause the alloy to disintegrate and to convert to a form from which contained nickel, cobalt and copper values can be recovered by leaching. The treatment involves contacting the alloy with an alkali metal sulphate or an alkali metal sulphite additive and heating the alloy and additive under controlled reducing conditions to initiate and continue an exothermic reaction. The reaction product is then quenched to cause disintegration thereof to a finely divided state amenable to a leaching treatment for extraction of nickel, cobalt and copper values.

5 Claims, No Drawings

DISINTEGRATION OF SCRAP ALLOYS TO FACILITATE RECOVERY OF NICKEL, COBALT AND COPPER VALUES

This application is a continuation-in-part of application Ser. No. 203,834 filed Dec. 1, 1971 and now abandoned.

This invention relates to the treatment of iron-chromium scrap alloys to cause the alloy to disintegrate and to cause contained nickel, cobalt and copper values to convert to a leachable form. More particularly, the invention relates to the treatment of iron-chromium scrap alloys in the form of machine turnings, chips and the like to disintegrate the same and to render the alloy particles responsive to leaching for separation of contained nickel, cobalt and copper values.

Scrap catalysts, residues and waste material generated during the production of ferrous and non-ferrous products often constitute important sources of nickel, cobalt and copper. In the production of nickel-containing steel articles, for example, a large quantity of waste material is produced. Such material is in the form of grinding sludge, roll and furnace scale, pickling vat sludge, machine turnings and metal clippings, for the machining and processing of the steel articles. In addition to iron and carbon, such waste material usually contains significant amounts of chromium, nickel, cobalt, copper manganese and molybdenum.

A number of processes are known for the separation of nickel, cobalt and copper values from ferrous alloys. In the treatment of ferro-nickel for example, the alloy is ground to a fine powder then leached in aqueous oxygenated ammonium sulphate or sulphuric acid for extraction of non-ferrous values.

These known processes are generally unsatisfactory for extraction of contained nickel, cobalt and copper values from iron-chromium scrap alloys. Such material is extremely tough and non-friable and can only be ground to a leachable size with great difficulty. The problems encountered in grinding such material are greater still if the material contains abrasives such as alumina or other alloying metals such as manganese, molybdenum and tungsten. Furthermore, even after grinding such material to a fine state, the material is usually resistant to leaching. Severe leaching conditions and prolonged times are required to extract nickel and other desired values such as cobalt and copper from the material.

It is an object of the present invention to provide a method of converting iron-chromium alloy scrap material from ordinary shop operations into metal powder from which any contained nickel, cobalt and copper values may be readily extracted by leaching.

Another object is to provide a process for treating iron-chromium scrap alloys which also contain values of nickel, cobalt, and copper to cause the alloys to disintegrate and to readily respond to conventional extracting procedures.

A further and more specific object is to provide an efficient and economic method for converting iron-chromium scrap alloys to a pulverulent form and to a form from which contained nickel, cobalt and copper values may be readily extracted such as by leaching in aqueous ammonium sulphate or sulphuric acid solutions.

These and other objects may be accomplished by a process which involves the steps of: contacting scrap alloy with an alkali metal sulphate additive or an alkali metal sulphite additive; heating the scrap alloy and the additive to a temperature below the melting point of said scrap alloy and under conditions reducing only with respect to metals whose oxides have energies of formation lower than that of iron in order to cause an exothermic reaction between the scrap alloy and additive; and quenching the reaction product from the preceding step to cause disintegration thereof.

As the exothermic reaction proceeds, the alloy matrix of the scrap material breaks down and the iron and chromium values react with the additive thereby converting to either metal oxides or metal sulphides. Contained nickel, cobalt and some copper values are thought to alter to an unalloyed metallic state. The remaining copper values are believed to convert to sulphides. The solid reaction product is extremely friable and upon quenching, disintegrates into fine particles. Usually the quenched particles are less than minus 65 mesh Standard Tyler screen in size.

The end product of the process may be passed directly to a leaching operation for extraction of any nickel, cobalt and copper values. It is unnecessary to grind the end product prior to the separation step. Moreover, in most cases, the extraction of nickel, cobalt and copper values from scrap alloy treated by the present process is surprisingly higher than the extraction from like scrap alloy of the same degree of subdivision as the end product of the present process but reduced to such degree by grinding.

In a single stage operation, the metal values which react with the additive are confined to those values in the surface layer of the scrap alloy. Metal values beneath the surface layer are unattacked by the additive and will not be disintegrated by quenching. Generally the surface layer is about 0.06 centimeters in thickness. Scrap alloys of thickness greater than 0.1 centimeters must be treated in two or more stages. In each stage the material is first heated in contact with additive under controlled conditions of temperature and reducing conditions as specified herein then rapidly quenched. A surface layer of about 0.06 centimeters in thickness will be converted to a pulverulent form after each stage and the treatment is repeated a sufficient number of times to pulverize the material completely.

It is to be understood that the term "iron-chromium scrap alloy" as used herein is intended to include all scrap alloys containing in addition to iron and chromium economically recoverable amounts of at least one of nickel, cobalt and copper. In addition to these materials, the scrap material may also contain a wide variety of other elements which are usually present in alloy scrap materials either as a constituent of the alloys or contaminants introduced during the scrap collecting and sorting operations. These scrap alloys are extremely tough and resistant to grinding. A decrease in the state of subdivision to a size at which metal values may be extracted from the alloys by leaching can only be accomplished with great difficulty.

The scrap alloy may be in the form of grinding sludge, roll and furnace scale pickling vat sludge, machine turnings and metal clippings and so on. Since one of the results of the process of the invention is to decrease the state of subdivision of the scrap alloy to a readily leachable size i.e., to a size which can be readily suspended in solution, the process will in practice be only carried out on scrap material which is larger than leachable size. In general this size will be larger that "dust" size i.e., larger than about 28 to 65 mesh standard Tyler screen. It should also be noted however that the process also brings about a metallurgical change in the scrap material whereby its nickel, cobalt and copper values will dissolve in a leach solution.

In carrying out the process of the invention, the scrap material is first contacted with an additive composed of either an alkali metal sulphate, an alkali metal sulphite or mixtures thereof. In general, an alkali metal sulphite is somewhat more effective than an alkali metal sulphate. Sodium sulphate and sodium sulphite are relatively inexpensive and are preferred additives for purposes of the invention.

The specific amount of additive required depends upon the composition of the scrap alloy. For example, the higher the iron content of the scrap alloy generally the more additive will be required. For economic reasons it is desirable to use the minimum amount of additive that is effective to render the end product of the process pulverulent and responsive to conventional leaching procedures. In general, up to about 40 percent additive by weight may be added but in most cases 15 to 25 percent is sufficient.

To ensure that the surface layer of the scrap material disintegrates following the quenching step, it is desirable that the entire surface of the scrap be contacted with the additive during the heating operation. The form which the scrap takes governs the method by which the necessary contact is achieved. Where the scrap material is in the form of grinding sludge or furnace scale, the scrap material and additive may be stirred together until the particles of one are more of less evenly distributed among those of the other. The mixture of scrap alloy and additive may then be pelletized by conventional pelletizing procedures to ensure that contact between the two materials continues throughout the subsequent heating and quenching operations.

Where the scrap material is in the form of turnings and chips, contact between the scrap material and additive during the heating operation is desirably achieved by placing the scrap material in a vented container loosely filled with granules of additive.

The scrap material, additive combination is then heated to a temperature at which the material and additive begin to react with each other. The material may be heated in a stationary furnace, a rotary kiln or other suitable furnace. Where the mixture of scrap alloy and additive is in the above described vented container, the alloy and additive are preferably heated in a rotary kiln.

During the heating operation it is essential to control the atmosphere within the furnace or kiln such that the conditions are reducing only with respect to the desired metal values in the scrap alloy, i.e., nickel, cobalt and copper and not with respect to those metals whose oxides have a higher energy of formation e.g., iron, chromium, manganese and tungsten. Where the reducing conditions are so controlled, little or no heat is usually required from an external source to continue the reaction between the additive and the scrap alloy after the reaction has commenced. This is so because metals such as iron and chromium whose oxides have a higher energy of formation than nickel, cobalt and copper oxidize when the scrap metal reaches the temperature required for the present process. The heat generated by the oxidation of such values is usually more than sufficient to ensure complete reaction between the additive and the scrap alloy.

A reducing atmosphere can be easily produced in the furnace by the introduction of gases evolved from the partial combustion of propane or from the steam reforming of naphtha. The reducing gases can be diluted with steam in order to adjust the furnace atmosphere to the required reducing conditions. Where the conditions are so adjusted, nickel, cobalt and copper values will be in a reducing atmosphere but chromium and iron will be free to oxidize.

The temperature at which the additive begins to react with the scrap material depends upon such factors as the composition and degree of subdivision of the scrap material, the amount of grease or other lubricant associated with the scrap and so on. In general, the temperature required to initiate the reaction is within the range of 650° to 1100°C.

The maximum temperature to which the mixture should be heated is governed by the melting point of the scrap alloy. It is unnecessary and undesirable to heat the scrap alloy to a temperature at which the scrap melts. This is so for several reasons. First, heat in excess of that required to initiate the reaction is required from an external source to melt the mixture. The melting point of some of the constituents of the mixture e.g., chromium oxide and tungsten oxide are vey high indeed and considerable heat is required for this purpose. This heat however is largely wasted since the rate of the reaction between the scrap and additive is little different at a temperature above the melting point than at a temperature below it. It makes little sense therefore to supply excess heat to melt the mixture when the reaction proceeds equally well at a temperature below the melting point. At the latter temperature, as indicated before, little if any external heat is required to maintain the reaction once it has commenced.

A second reason for not heating the mixture of scrap material and additive to melting temperature is that the mixture when molten is much more difficult to handle than it is in a solid state. The molten mixture is highly corrosive and can only be contained in vessels lined with refractory material. Such vessels are not required where the mixture is not heated to the melting point. The cost of handling the mixture when heated to a molten state is accordingly very much higher than where the mixture is not heated to melting temperature.

In general, it is preferred to maintain the temperature within the furnace at about 800° – 900°C.

The reaction between the scrap alloy and additive involves the break down of the alloy matrix and oxidation of iron and chromium values. As indicated above, the oxidation reaction is exothermic and once the reaction has been initiated usually no further heat need be applied from an external source to ensure continuation of the reaction. Completion of the reaction can be detected by monitoring the temperature within the furnace. When the temperature begins to decrease, the reaction is substantially complete.

Following the heating step, the reaction product is quenched in order to cool the material instantaneously. The product may be quenched in a container of water or may be quenched by directing a high velocity continuously flowing stream of water against the material.

Quenching is important since it exposes the reaction product to thermal shock and thereby causes it to disintegrate into fine particles. In the absence of quenching the reaction product must be ball milled for a lengthy period or otherwise ground to decrease its state of subdivision to a size at which it can be leached by suspending it in a leach solution. The quenching step is also important because it prevents oxidation of nickel, cobalt and copper values in the reaction product. In an oxidized state such values cannot be recovered by leaching.

Nickel, cobalt and copper values may be removed from the quenched end product of the subject invention using conventional leaching procedures. In most cases, the values can be readily extracted from the product by aqueous acid oxidation leaching at elevated temperature and pressure. According to this procedure, the end product is dispersed in an aqueous sulphuric acid solution containing at least the stoichiometric amount of acid required to combine with contained nickel, cobalt and copper as sulphates. The resulting slurry is heated to about 120°C. – 127°C. with continuous agitation and under a partial pressure of oxygen of about 15 – 30 p.s.i. About 3–4 hours is usually required to obtain extraction of 90 percent or more of the nickel and cobalt.

Alternatively, the end product of the present process can be leached by means of an ammoniacal ammonium sulphate solution. A satisfactory leach slurry contains about 150 grams per litre free ammonia (introduced into solution as, for example, ammonium hydroxide), about 300 grams per litre ammonium sulphate and sufficient end product to provide 60 grams per litre nickel plus cobalt plus copper in solution. The slurry is heated with agitation to approximately 85° – 95°C. under an oxygen pressure of 20 p.s.i.g. to dissolve the nickel, cobalt and copper values.

The invention is further described in the following examples which are intended as illutrative only and not by way of limitation.

EXAMPLE 1

The specific procedure followed in carrying out the process of the present invention is described with reference to the treatment of machine shop grindings of a high temperature nickel and cobalt containing alloy. The size of the alloy particles was about 62 percent minus 65 mesh Standard Tyler screen and the balance minus 35 mesh. The bulk density was 2.67 gms/c.c. The material analyzed (by weight) 53% Ni, 6.7% Co, 10% Fe, 3.5% Mo, 18% Cr, 0.25% W and 0.23% S.

A dry blend was formed composed of about three parts by weight grindings and one part of particles of minus 35 mesh sodium sulphate. Using standard procedures, the blend was molded into briquettes 6 × 2.54 × 0.18 centimeters. The briquettes were roasted in a rotary kiln equipped with direct flame heating burners operating at 875°C. The retention time of the briquettes in the kiln was 30 minutes. The atmosphere within the kiln analyzed (volume on a dry basis) 78% $N_2$, 4.0% $H_2$, 9.0% $CO_2$, 1.0% $O_2$, 6.0% CO, 0.8% COS, 0.2% $C_xH_y$ and less than 50 p.p.m. $SO_2$.

Following roasting, the briquettes where quenched in water, then ground in a ball mill for 15 minutes. The size of the material following grinding was (by weight) 91.2 percent minus 65 mesh and the balance minus 28 mesh. A chemical analysis of the disintegrated material was: (by weight) 41.2% Ni, 5.5% Co, 8.84% Fe, 0.06% Mo, 13.2% Cr, 18% $O_2$, 0.26% W, 6.69% S and 0.14% Cu.

The material was then charged into an autoclave containing about 1 mole of sulphuric acid per mole of material. The acid was maintained at 120°C. under an over-pressure of oxygen of 30 p.s.i.g. After four hours, the liquid was separated from the solid residue.

An analysis of the separated liquid showed that 98.4% of the nickel and 95.3 percent of the cobalt was extracted from the starting alloy grindings and dissolved in the liquid.

EXAMPLE 2

The procedure followed in the treatment of alloy turnings is described in this example. The starting material was a nickel-cobalt alloy approximately 99 percent + 10 mesh in size and consisting of turning coils and spirals of irregular shape being approximately 0.6 × 10.16 × .5 centimeters in size and somewhat contaminated with cutting or cooling oil. The material analyzed (by weight) 53% Ni, 7.0% Co, 10% Fe, 3.5% Mo, 20% Cr, and less than 1% S.

Two parts by weight of the alloy turnings were combined with one part of sodium sulphite in a perforated ½ pint can. The can together with its contents were placed in a rotary kiln and the kiln was heated to 875°C. The can remained in the kiln for 30 minutes. The atmosphere within the kiln analyzed (volume on a dry basis) 80 to 82% $N_2$, 1 to 4% $H_2$, 8 to 12% $CO_2$, 1 to 1.5% $O_2$, 2 to 6% CO, 0.8 to 1.2% COS and 0.1 to 0.5% $C_xH_y$.

The can and its contents disintegrated within the furnace and the disintegrated mass was quenched in water. After quenching, the material was ball milled for 15 minutes. The size of the material discharged from the ball mill was 78.5 percent minus 28 mesh. A chemical analysis of the discharge material was: 37.6% Ni, 6.48% Co, 13.0% Fe, 1.2% Mo, 10.8% Cr, 0.05% W, 7.62% S and 16.2% $O_2$.

The material was leached in the same manner as described in Example 1 and an analysis of the liquid showed that 97.9 percent of the nickel and 94.8 percent of the cobalt were extracted and dissolved in the liquid.

From the results of experiments 1 and 2, it is clear that treatment of nickel and cobalt scrap alloy material by the process of the invention results in better than 98 percent extraction of nickel and 94 percent cobalt.

EXAMPLE 3

In this example a comparison is made between the effectiveness of the additives specified herein and the effectiveness of other sulphur containing additives in bringing about the disintegration and conversion of a starting iron-chromium starting alloy to a form from which contained nickel, cobalt and copper values may be leached. The starting material was made up of machine turnings and chips 10 percent + 4 mesh and 15 percent − 65 mesh in size and having the following overall analysis (approximate by weight) 53% Ni, 7% Co, 10% Fe, 3.5% Mo, 20% Cr, 0.25% W and less than 0.1% S.

Samples were prepared by blending about three parts by weight of the starting material with one part of the additives specified below. The samples were placed in ½ pint cans and the cans and contents were heated at 870°C. in a rotary kiln for 15 minutes. The atmosphere within the kiln during the heat treatment of each sample was identical except for gases introduced into the atmosphere by the different additives.

After heating, the cans and their contents were quenched in water and ball milled for 15 minutes. The size of the resulting material was compared with the size of the starting material. The ground material from each sample was then leached under identical conditions in an ammoniacal ammonium sulphate solution. The results are as follows:

| Sample No. | Additive | Size of quenched material compared to size of starting material | Proportion of Nickel, Cobalt and Copper Values in Starting Material dissolved in Leach Solution |
|---|---|---|---|
| 1 | Calcium sulphate | $-65$ mesh fraction increased by less than 5% | Negligible |
| 2 | Nickel sulphate | Negligible | Negligible |
| 3 | Copper sulphate | Negligible | Negligible |
| 4 | Elemental sulphur | Negligible | Negligible |
| 5 | Sodium sulphate | Much smaller | More than 95% |

In the case of samples 2 and 3 the exit gases from the kiln contained excessive quantities of $SO_2$ which were evolved from the decomposition of the additives. In the case of sample 4, elemental sulphur sublimed before the reaction temperature was reached and the sulphur discharged with the exit gases.

The results of this experiment show the strikingly different results from use of the different additives. The only additive which was at all effective was sodium sulphate. The remaining additives would be useless for purposes of the subject invention as would oxides of sulphur such as $SO_2$ which would discharge from the kiln before the reaction could begin and hence would not bring about the desired reaction.

What we claim as new and desire to protect by Letters Patent of the United States is:

1. A process for causing iron-chromium scrap alloys containing a metal selected from the group consisting of nickel, cobalt and copper of larger than 65 mesh standard Tyler screen in size to disintegrate and to convert to a form from which contained values of at least one of nickel, cobalt and copper may be extracted in a subsequent leaching step said process including the steps of: contacting said scrap alloy with an additive selected from the group comprising alkali metal sulphate and alkali metal sulphite; heating the scrap alloy and the additive to a temperature below the melting point of said scrap alloy and under conditions reducing only with respect to metals whose oxides have energies of formation lower than that of iron in order to cause an exothermic reaction between the scrap alloy and additive with resulting conversion of iron and chromium values to metal oxides and/or metal sulphides; and quenching the reaction product from the preceding step to cause disintegration thereof.

2. The process as claimed in claim 1 wherein the temperature to which said scrap alloy and additive are heated is within the range of about 800° to 900°C.

3. The process as claimed in claim 2 wherein said scrap alloy is contacted with about 15 to 25 percent by weight additive.

4. The process as claimed in claim 2 wherein said additive is sodium sulphate.

5. The process as claimed in claim 2 wherein said additive is sodium sulphite.

* * * * *